(No Model.) 2 Sheets—Sheet 2.
P. J. LAWLER & J. F. BARRY.
CORN HARVESTER.
No. 425,515. Patented Apr. 15, 1890.
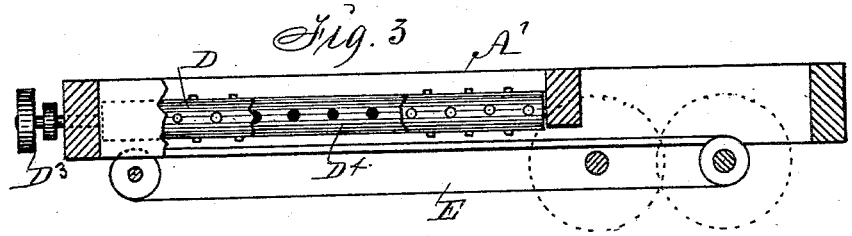
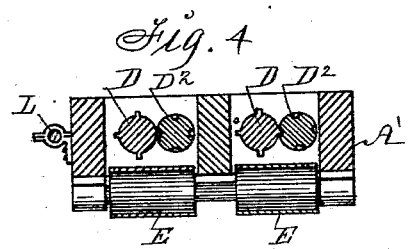
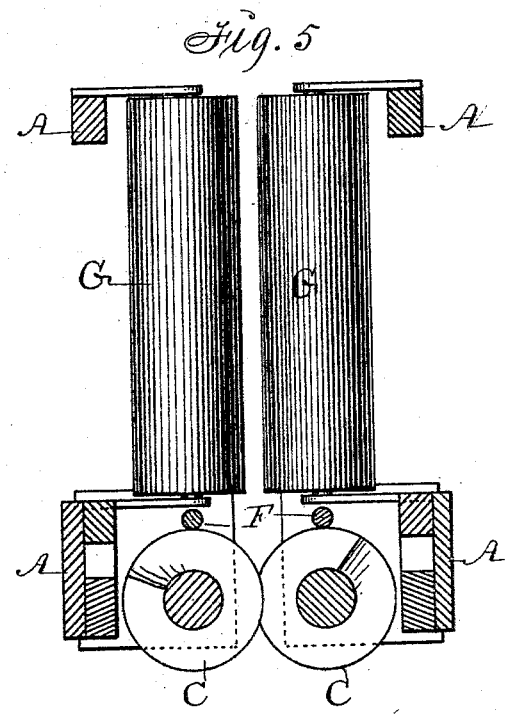
Witnesses: Inventors: Patrick J. Lawler,
R. H. Orwig and John F. Barry,
C. U. Stiles By Thomas C. Orwig, Attorney

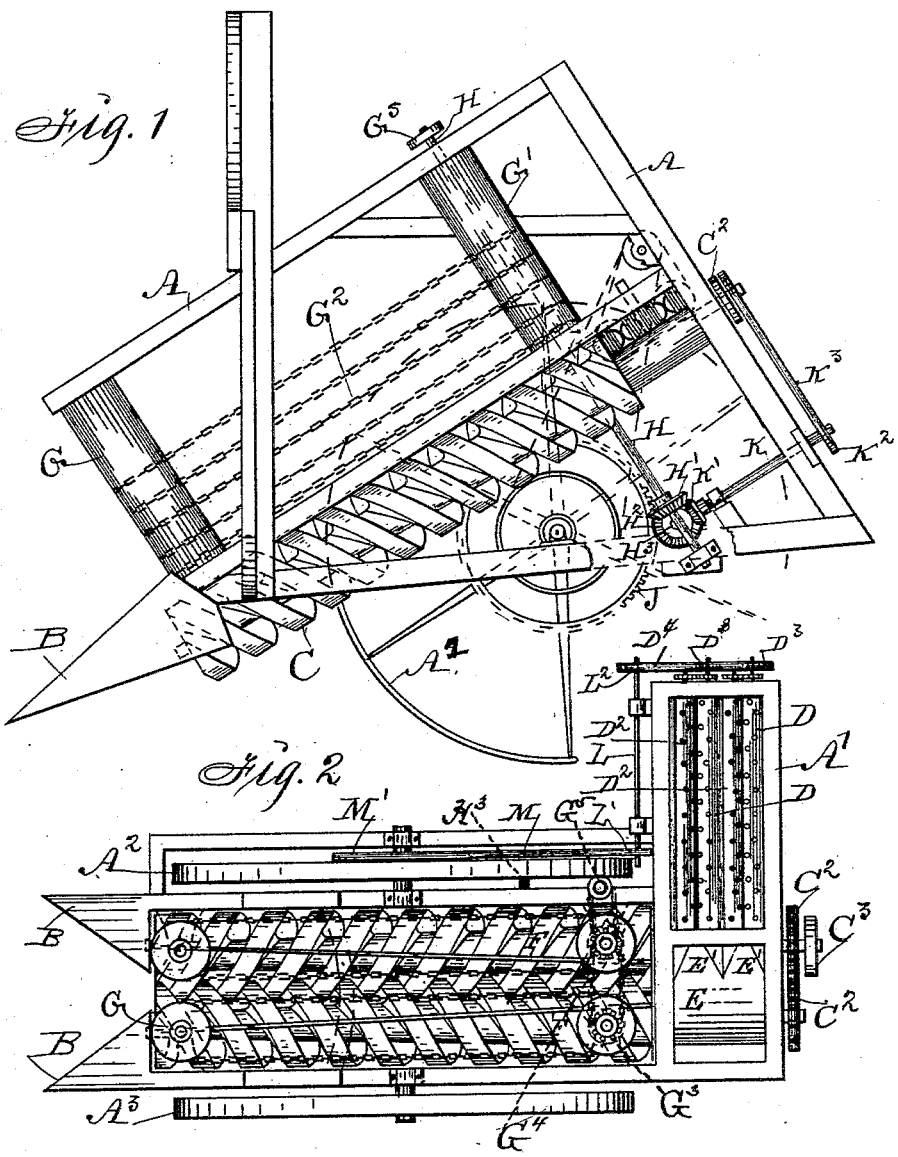

UNITED STATES PATENT OFFICE.

PATRICK J. LAWLER AND JOHN F. BARRY, OF WEST SIDE, IOWA.

CORN-HARVESTER.

SPECIFICATION forming part of Letters Patent No. 425,515, dated April 15, 1890.

Application filed May 20, 1889. Serial No. 311,462. (No model.)

*To all whom it may concern:*

Be it known that we, PATRICK J. LAWLER and JOHN F. BARRY, citizens of the United States of America, and residents of West Side, in the county of Crawford and State of Iowa, have invented certain new and novel Improvements in Corn-Harvesters, of which the following is a specification.

Our present invention has relation to improvements in that class of corn-harvesters known as "strippers" and "huskers;" and it consists in the construction, combination, and arrangement of parts, as hereinafter described, pointed out in the claims, and illustrated in the accompanying drawings, in which—

Figure 1 shows a side elevation with parts broken away, and Fig. 2 represents a top view of our improvement with the yoke-frame removed. Figs. 3, 4, and 5 are enlarged detail views of different parts.

A represents a quadrilateral-shaped frame composed of two mating sections that are rigidly connected at their front portions by means of a yoke $A^4$, that projects perpendicularly, as shown in Fig. 1, and as required to stride a row of corn, the sills of which are strengthened by means of suitable transverse braces, and that is provided at the rear with an auxiliary transverse frame A', as shown in Fig. 2. The frame is supported upon two wheels $A^2$ $A^3$. The wheel $A^2$ is provided with a sprocket-wheel and a gear-wheel, by means of which motive power is applied to the operating mechanism of our device. The lower supporting-sills of the main frame are provided at their forward ends with the triangular-shaped gatherers B B, which are preferably of metal, and are mounted so that they do not extend quite across the forward portion of the frame, but leave a suitable opening through which the cornstalk may pass.

C C are two cylindrical spiral conveyers having cone-shaped bodies, each provided at its ends with suitable journals, one of which is adapted to work within a suitable bearing upon one of the transverse braces at the rear of the frame, while the other is adapted to work within a bearing of the gatherer, as shown by dotted lines in Fig. 1. The conveyers interlock and revolve inwardly and in opposite directions to one another. They are mounted slightly at an angle, so that the rear portions of the conveyers are slightly higher than the forward, as illustrated in Fig. 1. The spiral portions of the conveyers do not extend quite the full length of the body portion, but end in a cylindrical portion, that extends below and beyond the auxiliary frame A'. At the rear the conveyers are provided with mating pinions $C^2$ $C^2$. The outer conveyer C is provided, in addition, with the sprocket-wheel $C^3$, which is engaged by an endless chain, as described hereinafter.

Immediately above the cylindrical ends of the conveyers and mounted transversely thereto are two sets of husking-rollers, comprising the male rolls D D and female rolls $D^2$ $D^2$. These rollers work above the endless belt E, which works upon the cylindrical portion of the conveyer C, and at the other end upon a suitable pulley (not shown) at the extreme end of the auxiliary frame A'. At their outer ends each set of husking-rollers is provided with a set of mating pinions, while the male rolls D D of each set are provided, in addition, with the sprocket-wheels $D^3$ $D^3$, which are engaged by the endless chain $D^4$.

E' E' are converging chutes, which are mounted above the endless belt E and have their converging points immediately in front of the husking-rolls, and are adapted to direct the corn carried upon the belt E to said husking-rollers, as will be understood by referring to Fig. 2 of the annexed drawings.

F F are two iron rods that rest upon the spiral conveyers and work within movable bearings at the front and rear of the frame. These rods serve as guard-rolls and keep the ears of corn as they are conveyed upward from working to the other side of the conveyers.

G G and G' G' are rollers that work in a perpendicular position and are mounted in brackets that extend above and to the center of the conveyers. The rollers are mounted in sets of two, each set being provided with a number of endless chains $G^2$ $G^2$, which work in line with the conveyers, as will be understood by referring to the figures. The rear roll of each set is provided with a sprocket-wheel $G^3$, which is adapted to be engaged by the endless chain $G^4$, which works upon the sprocket $G^5$ of the driving-shaft H. This shaft is mounted within bearings at the side of the frame, and is provided at its lower end with a miter-gear H', which engages the corresponding miter H² of the transverse driving-shaft H³. The shaft H³ is journaled to suitable transverse braces of the frame, and is provided in addition to the miter H² with a pinion (on the shaft H³, but not shown) which engages the gear-wheel J, fixed to the driving-wheel A³, from which the shaft H³ receives its motive power.

K is a shaft that is mounted at right angles to the driving-shaft H³, and is provided with a miter-gear K' in connection with the gear H² from which it receives its motive power. At its outer end the shaft K' is provided with a sprocket-wheel K², which is engaged by the chain K³, connected to the sprocket-wheel C³ of the spiral conveyers C.

Connected to the side of the auxiliary frame is a shaft L, which is provided with two sprocket-wheels L' L². The wheel L' is engaged by the endless chain M, which works upon the sprocket-wheel M' of the driving-wheel A², as shown in Fig. 2. The sprocket L² is engaged by the chain D⁴ in connection with the sprocket-wheels D³ D³ of the husking-rolls D D.

The conveyers C C are operated as follows: As the machine is carried forward the gear-wheel J rotates the pinion on the end of the shaft H³, and that shaft, being geared to the shaft K, imparts rotary motion thereto and to the sprocket K². The sprocket K² is connected to the geared conveyer by means of the chain K³, and thereby imparts rotary motion to the conveyers, as will be understood by referring to Fig. 1.

The husking-rollers are operated by means of the endless chains D⁴ and M, which latter is connected with a sprocket-wheel fixed to the wheel A².

The upright rollers G G' are operated by means of the shaft H, which is connected at its lower end to the transverse driving-shaft H³ and at its upper end by means of a sprocket-wheel G⁵ and chain G⁴ to the rear rolls, as illustrated in Fig. 2.

The operation of our machine is as follows: The machine is drawn over a row of standing corn, which is led by the gatherers B B to the conveyers C C. As the stalks pass between the conveyers C C the ears are pinched off and carried upward until they fall upon the conveying-belt E. This belt carries the ears to the husking-rollers D D², which tear the husks from the ears. The chains G² upon the upright rollers prevent the stalks from lopping upon the conveyer, while the rods F keep the ears within the conveyers.

Having thus described our said invention, what we claim as new, and desire to secure by Letters Patent, is—

1. In a corn-harvester, the reciprocating spiral conveyers C C, the guard-rods F F, working upon said conveyers, the endless belt E, working transversely to the said conveyers, and the husking-rolls D D², working above the belt E, in combination with suitable supporting and operative mechanism, substantially as described.

2. A corn-harvester composed of the mating frames A, connected by means of a yoke and mounted upon wheels A² and A³, the cylindrical conveyers C, each having a fixed pinion C², the chain-wheel fixed to one of the conveyers, the frame A', and the husking-rollers D D D² D², the converging chutes E and E', the rollers G and G', chains G², the sprocket-wheel G³, and chain G⁴; and the sprocket-wheel G⁵ on the shaft H, and mechanism for operating the shaft H, arranged and combined substantially as shown and described.

PATRICK J. LAWLER.
JOHN F. BARRY.

Witnesses:
JOHN H. LAWLER,
MICHAEL LAWLER.